US006638153B2

(12) United States Patent
Lee et al.

(10) Patent No.: US 6,638,153 B2
(45) Date of Patent: Oct. 28, 2003

(54) DIAMOND SAW BLADE EQUIPPED WITH UNDERCUT PREVENTING TIP

(75) Inventors: Chang Hyun Lee, Pyongtaek-Si (KR); Youn Chul Kim, Suwon-Si (KR)

(73) Assignee: Ehwa Diamond Ind. Co. Ltd., Kyongki-do (KR)

( * ) Notice: Subject to any disclaimer, the term of this patent is extended or adjusted under 35 U.S.C. 154(b) by 0 days.

(21) Appl. No.: 09/887,216

(22) Filed: Jun. 22, 2001

(65) Prior Publication Data

US 2002/0115399 A1 Aug. 22, 2002

(30) Foreign Application Priority Data

Feb. 19, 2001 (KR) .......................................... 2001-8263

(51) Int. Cl.[7] ................................................ B23F 21/03
(52) U.S. Cl. ....................... 451/547; 451/540; 451/542; 451/548; 125/12; 125/13.01; 125/15
(58) Field of Search ................................ 451/540, 542, 451/547, 548; 125/12, 13.01, 15

(56) References Cited

U.S. PATENT DOCUMENTS 3,599,622 A * 8/1971 Baron ......................... 125/15
4,462,382 A * 7/1984 Baron et al. .................. 125/15

* cited by examiner

*Primary Examiner*—Joseph J. Hail, III
*Assistant Examiner*—Shantese McDonald
(74) *Attorney, Agent, or Firm*—Jaeckle Fleischmann & Mugel, LLP

(57) ABSTRACT

The invention relates to a diamond saw blade which is made by attaching improved undercut preventing tips, produced by diffusing and joining cobalt-based powder onto ultra hard tips at a high temperature, to respective shank slot walls formed on the circumference of a diamond saw blade by means of laser welding in order to remove drawbacks of high cost or insecurity with the conventional art.

According to the present invention, there is proposed a diamond saw blade with a shank, and with plural diamond tips provided on the circumference of the shank at a finite interval, slots for discharging cut chips being positioned between the adjoining diamond tips, further comprising undercut preventing tips disposed on respective walls of said slots, said undercut preventing tips including tungsten-carbide-based ultra hard tips provided with cobalt-based layer, wherein said undercut preventing tips are formed by diffusing and joining the cobalt-based powder to said ultra hard tips at a high temperature and said undercut preventing tips are fixed on respective walls of said slots by means of laser welding.

4 Claims, 3 Drawing Sheets

DIAMOND SAW BLADE EQUIPPED WITH UNDERCUT PREVENTING TIP

FIELD OF THE INVENTION

The present invention relates to a diamond saw blade used to cut abrasive material like concrete or asphalt, and more specifically to a diamond saw blade which is made by attaching improved undercut preventing tips, produced by diffusing and joining cobalt-based powder onto cemented carbide tips including tungsten carbide powder at a high temperature, to each of shank slot walls formed on the circumference of a diamond saw blade by means of laser welding.

BACKGROUND OF THE INVENTION

A conventional diamond saw blade 10 for cutting abrasive material as mentioned above comprises, as shown in FIG. 3, plural tips 14 attached to the circumference of a shank 12 at a finite interval and slots 12*a* for discharging cut chips, the slots being positioned between the adjoining two diamond tips 14.

These slots and diamond cutting tips were, in a negative manner, subjected to the chip powder or scraps generated at the material being cut during cutting operation. In other words, the shavings, powder or scraps produced from asphalt, concrete or the like during a rotary cutting operation tend to erode the area of slots 12*a* as they move at high speed toward the circumference of a shank due to centrifugal force, resulting in undercut phenomena.

As the result of these undercut phenomena, the contact area of the diamond tips with the shank 12 is first eroded or cracked and subsequently a breakage state can follow or even diamond tips 14 can fall off the shank 12.

Accordingly, diamond tips come to fail in conducting their function owing to the undercut phenomena, before their life is over. As the result, the life of the diamond saw blade is in turn shortened, causing the problem of imperfect performance in cutting work.

In an effort to resolve such a conventional problem in connection with undercut effect, the wedge segment designed to position lower than normal was proposed for the diamond chip and there was also another proposal that only cemented carbide tips be provided to chip discharging slot walls in a steel core.

In the case of the wedge segment, the machining process for a shank is complex and the wedge segment requires more material than its ordinary counterpart, resulting in increased production cost. In the case of using the cemented carbide tips, the need for manual joining work by using silver-lead causes the decrease in productivity. Particularly, for the case of using the tip on semi-dry basis, there may be some risk because cemented carbide tips including tungsten carbide powder can fall off during a cutting operation due to the weak welding from thermal instability.

SUMMARY OF THE INVENTION

The present invention is intended to resolve the above-described problems with the conventional art and so the object of the invention is to provide a diamond saw blade which is made by attaching undercut preventing tips, produced by diffusing and joining cobalt-based powder to cemented carbide tips at a high temperature, to respective shank slot walls formed on the circumference of a diamond saw blade by means of laser welding.

The object as described above is achieved according to an aspect of the invention by a diamond saw blade with a shank, and with plural diamond tips provided on the circumference of the shank at a finite interval, slots for discharging cut chips being positioned between the adjoining diamond tips, further comprising undercut preventing tips disposed on respective walls of said slots, said undercut preventing tips including tungsten-carbide-based ultra hard tips provided with cobalt-based layer, wherein said undercut preventing tips are formed by diffusing and joining the cobalt-based powder to said ultra hard tips at a high temperature and said undercut preventing tips are fixed on respective walls of said slots by means of laser welding.

DESCRIPTION OF THE PREFERRED EMBODIMENTS

A preferred embodiment of the invention will be described in detail below by referring to accompanying drawings.

Figure 2:
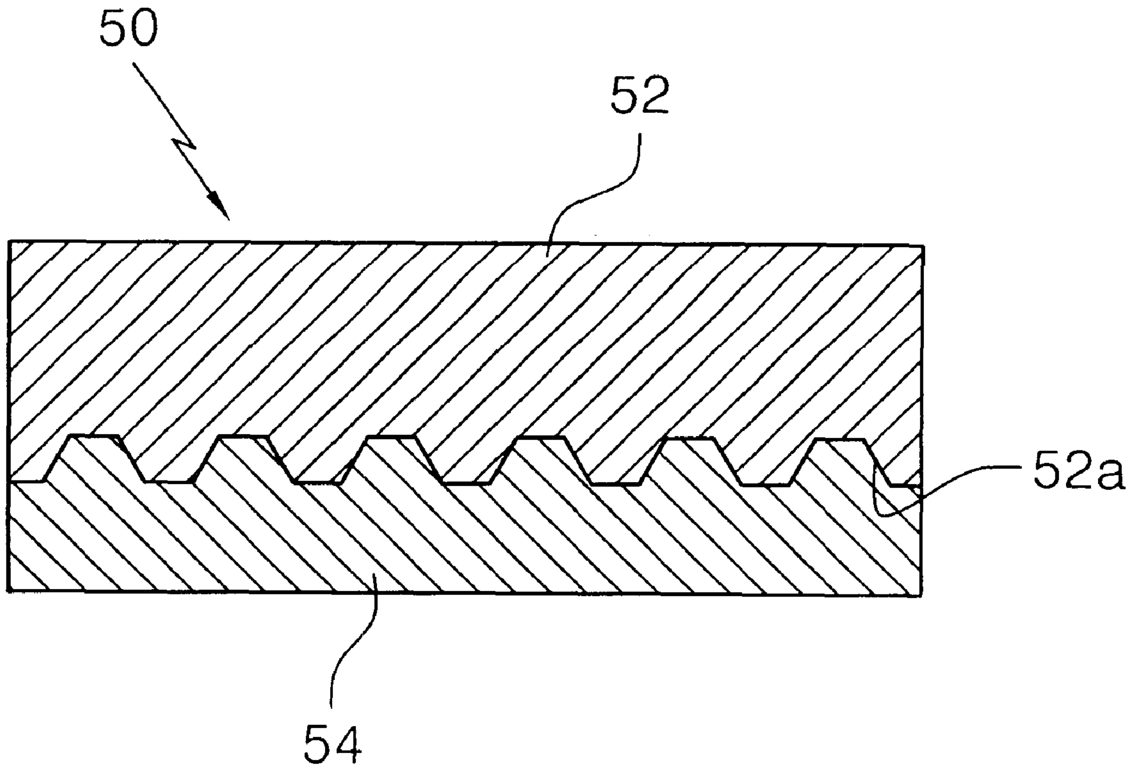
FIG. 2 shows the enlarged view of a undercut preventing tip employed in the invention and FIG. 3 shows the front view of a conventional diamond saw blade.
Figure 3:
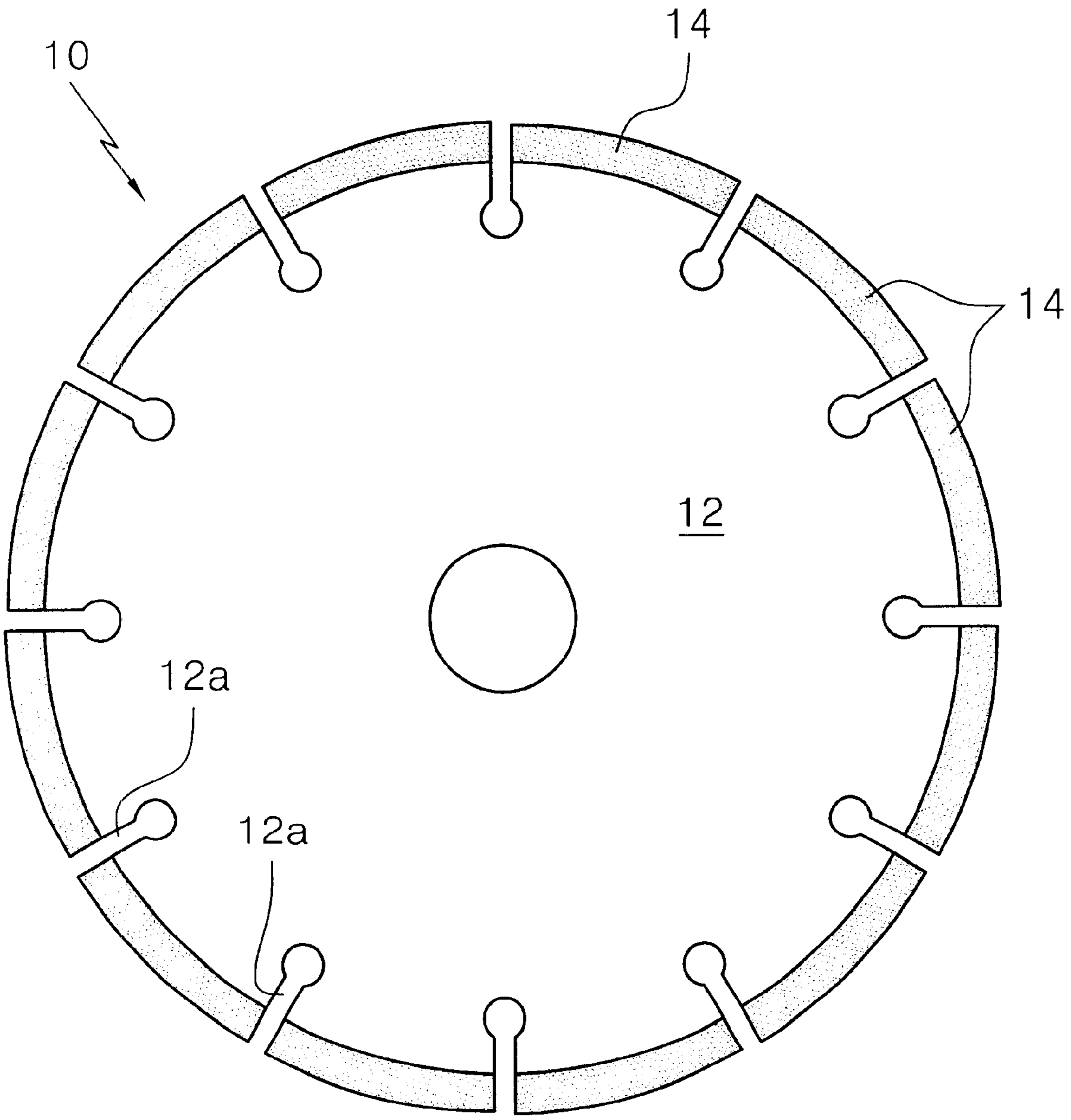

The undercut preventing tip 50 according to the invention is made by integrating cobalt-based formed tip 54 to a cemented carbide tip 52, as shown in FIG. 2.

The cemented carbide tip 52 is fabricated through a sintering at a temperature of over 800° C. in such a manner that on at least one side, steps 52*a* are formed at a finite interval to improve the biding strength. The cemented carbide tip 52 is composed of a great proportion of tungsten carbide (WC) and 5 wt. % or more of cobalt as the balance.

When the cobalt content in the cemented carbide tip falls below 5 wt.%, sintering binding force with the cobalt-based metal powder drops, while at a too high cobalt content, the hardness of the ultra hard tip 52 is deteriorated.

The sintered cemented carbide tip 52 is placed in a metal mold, in which the cobalt-based powder to be molded with the cemented carbide tip is then introduced in a sintering atmosphere. The set is maintained at a temperature as high as 800° C. for several minutes, and then the cobalt-based powder is fused and sintered to be integrally attached to the cemented carbide tip 52.

If the sintering temperature of the cobalt-based powder is below 800° C., full density was not acquired. On the other hand, if the sintering temperature gets too high, the metal powder is apt to melt down, disturbing the desired sintering.

As the cobalt-based metal powder, the cobalt (Co), nickel (Ni) or iron (Fe) may be used as single or in a mixture of selected ones and particularly preferably a cobalt content of over 50 wt. % may be used.

Preferably the ultra hard tip 52 and the cobalt formed tip are joined together, so that the interface between them are in the form of zigzagged steps so as to increase the mutual binding force.

The invention is not restricted to the form of steps for the interface but allows various forms of irregularity or corrugation. That is, a variety of forms including trapezoid, quadrangle, triangle or the like may be employed to increase the interface area.

Figure 1:
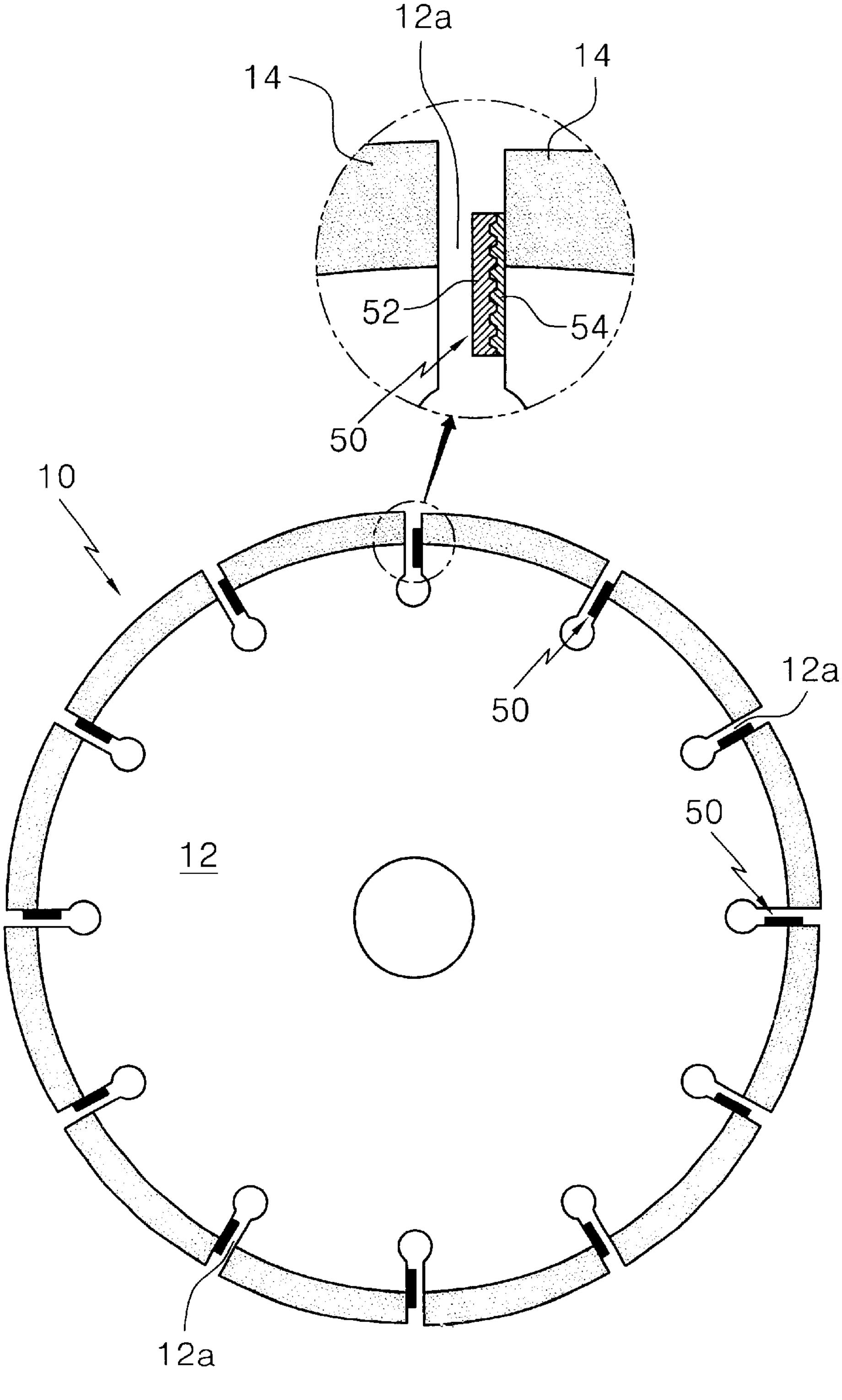
FIG. 1 shows the view of attached state for the undercut preventing tips provided on a diamond saw blade according to a preferred embodiment of the invention.

The undercut preventing tips 50 so produced according to the invention are attached to the respective walls of the slots 12*a* formed on the circumference of saw blade shank 12 by means of laser welding, so that they are positioned to cover the junctions between the shank 12 and the diamond tips, as seen in FIG. 1.

In particular, the undercut preventing tips 50 are fixed to the saw blade 10, with the cobalt-based formed tips 54 facing the side surface of the slots 12*a*, by means of laser welding. Because this attachment is based on the thermal fusion of the cobalt-based sintered tips 54 on the wall surface of the slots 12*a*, the thermal stability under a severe processing condition is much more improved than in the conventional case of using silver-lead welds, to provide a marked merit for cutting operation. Accordingly, the undercut preventing tips 50 can perform their undisturbed original function of preventing the undercutting, so that the service life of diamond saw blades may be improved. As another thing, the cobalt-based cemented carbide tip can suffer less from degrading of physical property as they are located underneath in the slot grooves.

Moreover, the use of laser welding for fixing undercut preventing tips allows the automation of the manufacturing process and thus the increase of productivity.

It is to be understood that, while the invention was described only with respect to a preferred embodiment of a diamond saw blade, the invention is never restricted to that embodiment and a variety of modifications and alterations would be possible to a man skilled in the art by referring to the description or drawings presented here and within the spirit of the invention and thus those modifications or alterations are to fall within the scope of the invention, which scope should be limited only by the attached claims.

What is claimed is:

1. A diamond saw blade with a shank, and with plural diamond tips provided on the circumference of the shank at a finite interval, slots for discharging cut chips being positioned between the adjoining diamond tips, further comprising undercut preventing tips disposed on respective walls of said slots, said undercut preventing tips including tungsten-carbide-based cemented carbide tips provided with cobalt-based layer, wherein said undercut preventing tips are formed by diffusing and joining the cobalt-based powder to said cemented carbide tips at a high temperature and said undercut preventing tips are fixed on respective walls of said slots by means of laser welding.

2. The diamond saw blade according to claim 1, wherein the cemented carbide tips are produced by sintering a metal mixture substantially of tungsten carbide at a temperature of over 800° C., the cobalt-based powder to be molded includes the metal powder of over 50 wt. % of cobalt, and lesser amounts of nickel and iron, the metal powder having a good weldability, and the sintered cemented carbide tips together with the cobalt-based powder are maintained at a temperature of over 800° C. for several minutes to yield undercut preventing tips by interface binding through the sintering.

3. The diamond saw blade according claim 1 or 2, wherein said cemented carbide tips include at least 5 wt. % of cobalt.

4. The diamond saw blade according claim 2, wherein the molded interface of the cobalt-based powder with said cemented carbide tips is in the form of irregularities or corrugations.

* * * * *